Mar. 6, 1923.
J. J. HARRISON
BUMPER LOCK
Filed Aug. 30, 1921
1,447,303
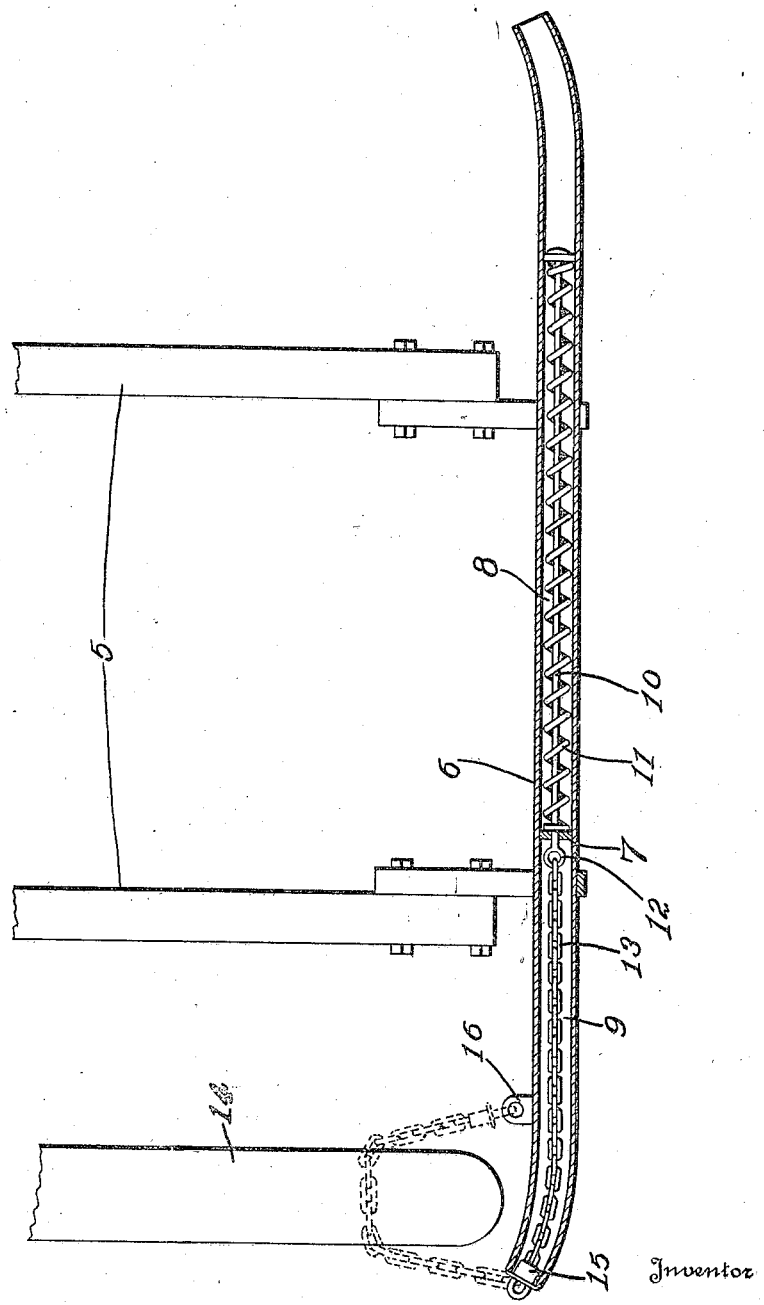
Inventor
J. J. Harrison.
By
Attorney

Patented Mar. 6, 1923.

1,447,303

UNITED STATES PATENT OFFICE.

JOHN J. HARRISON, OF PORTLAND, OREGON.

BUMPER LOCK.

Application filed August 30, 1921. Serial No. 496,874.

*To all whom it may concern:*

Be it known that I, JOHN J. HARRISON, a citizen of the United States, residing at Portland, in the county of Multnomah and State of Oregon, have invented a new and useful Bumper Lock, of which the following is a specification.

This invention relates to motor vehicle locking devices, and more particularly to a locking device operating in conjunction with the front wheels of the vehicle, to prevent turning of the wheels to accomplish the steering of the vehicle.

Another object of the invention is to provide a device of this character which will normally be housed by the bumper carried at the front end of the vehicle.

A still further object of the invention is to provide a lock of this character which may be readily and easily brought into operation, to accomplish its purpose.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:—

The figure illustrates a fragmental view of the front ends of the side rails of a chassis of a motor vehicle showing a bumper as supporting a lock constructed in accordance with the present invention.

Referring to the drawing in detail, the reference character 5 designates the front ends of the side rails of a vehicle chassis to which the tubular bumper 6 is secured.

The tubular bumper 6 is of the usual construction, the same being provided with open ends to accommodate the locking element forming the subject matter of the invention and as shown, a partitioning member 7 is supported within the bumper dividing the same into a spring compartment 8 and a chain compartment 9.

The lock comprises a rod 10 which is positioned within the bumper, there being provided a suitable opening in the partitioning member 7 to permit the rod 10 to move therethrough, the partitioning member acting as a stop for one end of the coiled spring 11 to place the spring under tension when the rod 10 is moved through the partitioning member 7.

As shown, this rod 10 supports the coiled spring 11, one end of the coiled spring being secured to the free end of the rod. The rod 10 is formed with an eye 12 adapted to accommodate one end of the chain 13 which is adapted to be placed around one of the front wheels of the vehicle, the wheel being indicated at 14.

Carried at the free end of the chain 13, is a lock 15 which is of a diameter to closely fit within one end of the bumper and close the bumper to exclude moisture and other foreign matter. An apertured lug 16 is formed on the bumper and is designed to accommodate the lock 15, so that when it is desired to lock the vehicle, the chain 13 may be withdrawn from the bumper, against the tension of the spring 11, and positioned around a wheel as shown in dotted lines in the Figure.

When it is desired to unlock the wheel, the lock 15 is disengaged from the lug 16. whereupon the spring 11 draws the chain 13 into the bumper, where the same is housed.

Having thus described the invention, what is claimed as new is:—

1. In combination with the front wheels and bumper of a motor vehicle, a lock including a flexible member positioned within the bumper, said flexible member adapted to be withdrawn from the bumper and positioned around a wheel of a vehicle, and means on one end of the flexible member for locking the flexible member to the bumper.

2. In combination with the front wheels and bumper of a motor vehicle, a lock including a rod movable within the bumper, a spring member encircling the rod, a chain having connection with the rod, a lock on one end of the chain and adapted to be placed through a wheel of the vehicle, an apertured lug on the bumper, and a lock on one end of the chain adapted to be connected to the lug.

3. A combined automobile bumper and wheel lock comprising a hollow bumper, a wheel locking chain confined therein and adapted to be projected from the end of the bumper for enclosing an automobile wheel adjacent the end of the bumper.

4. A combined automobile bumper and wheel lock comprising a hollow bumper, a wheel locking chain confined therein and adapted to be projected from the end of the bumper for enclosing an automobile wheel adjacent the end of the bumper, and means for limiting the outward movement of the locking chain.

5. A combined automobile bumper and wheel lock comprising a hollow bumper, a wheel locking chain confined therein and adapted to be projected from the end of the bumper for enclosing an automobile wheel adjacent the end of the bumper, and cooperating means carried by the bumper and locking chain for limiting the outward movement of the locking chain.

6. A combined automobile bumper and wheel lock comprising a hollow bumper, a compression spring anchored therein, a locking chain disposed within the bumper and engaged by said spring, and cooperating means carried by the bumper and locking chain to anchor the free end of the chain to the bumper when the same is positioned for enclosing a wheel adjacent the end of the bumper.

In testimony that I claim the foregoing as my own, I have hereto affixed my signature in the presence of two witnesses.

JOHN J. HARRISON.

Witnesses:
 JOSEPHINE GOODALE,
 E. PINDER.